W. J. CROWELL, Jr.
RATIO INDICATING AND RECORDING METER.
APPLICATION FILED AUG. 21, 1918.
1,308,626.
Patented July 1, 1919.
2 SHEETS—SHEET 1.
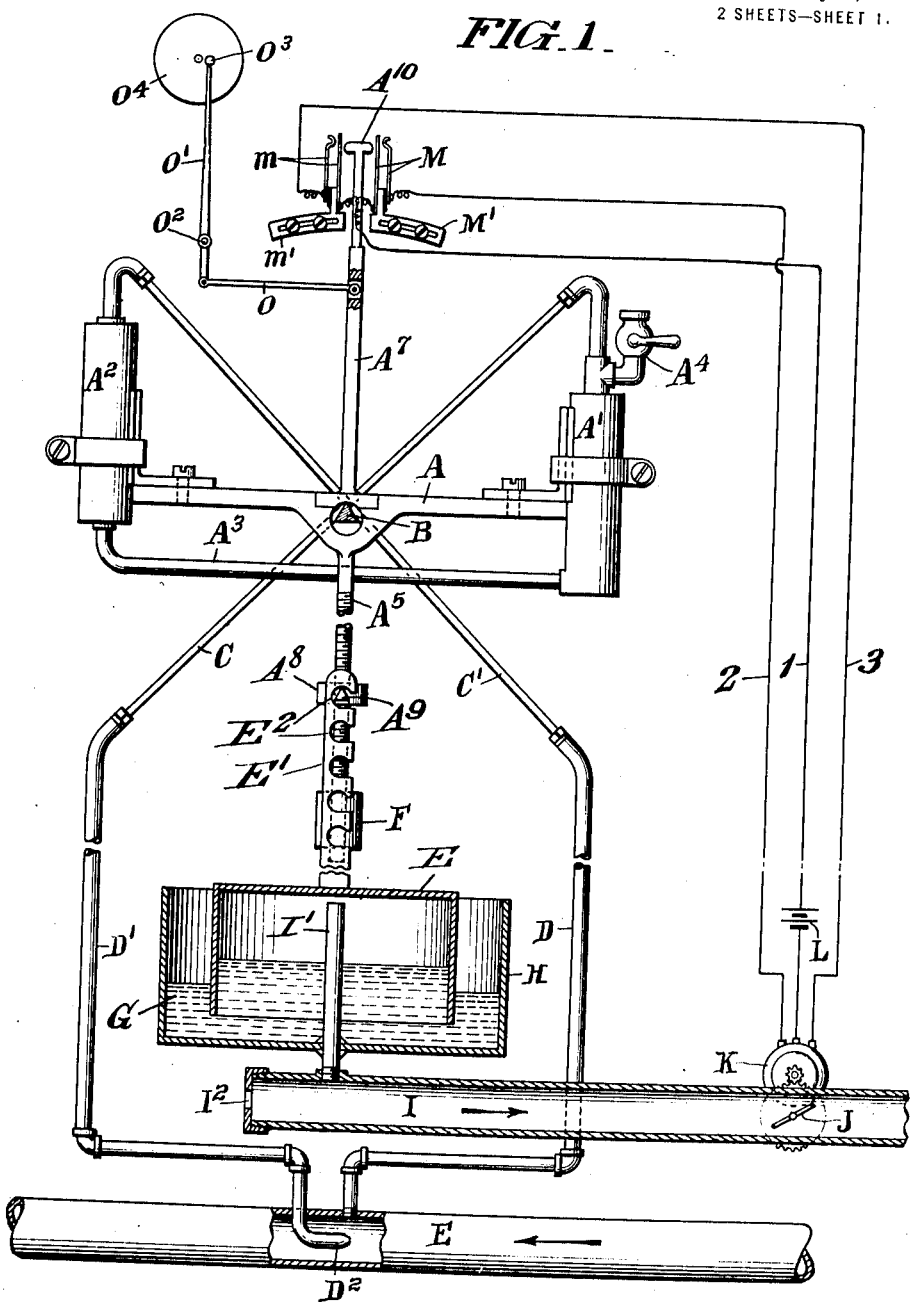

W. J. CROWELL, Jr.
RATIO INDICATING AND RECORDING METER.
APPLICATION FILED AUG. 21, 1918.
1,308,626.
Patented July 1, 1919.
2 SHEETS—SHEET 2.
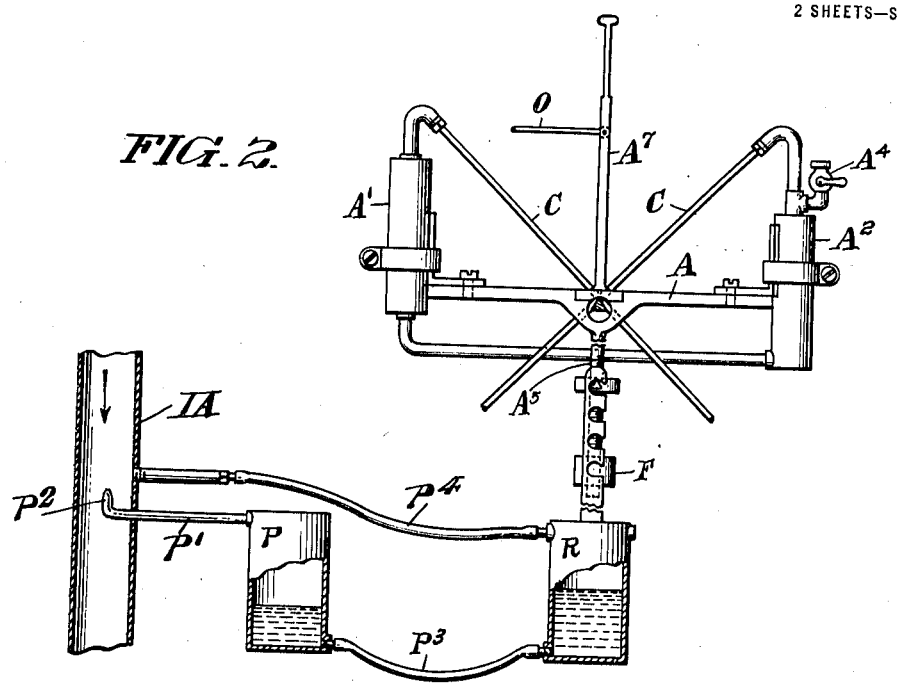
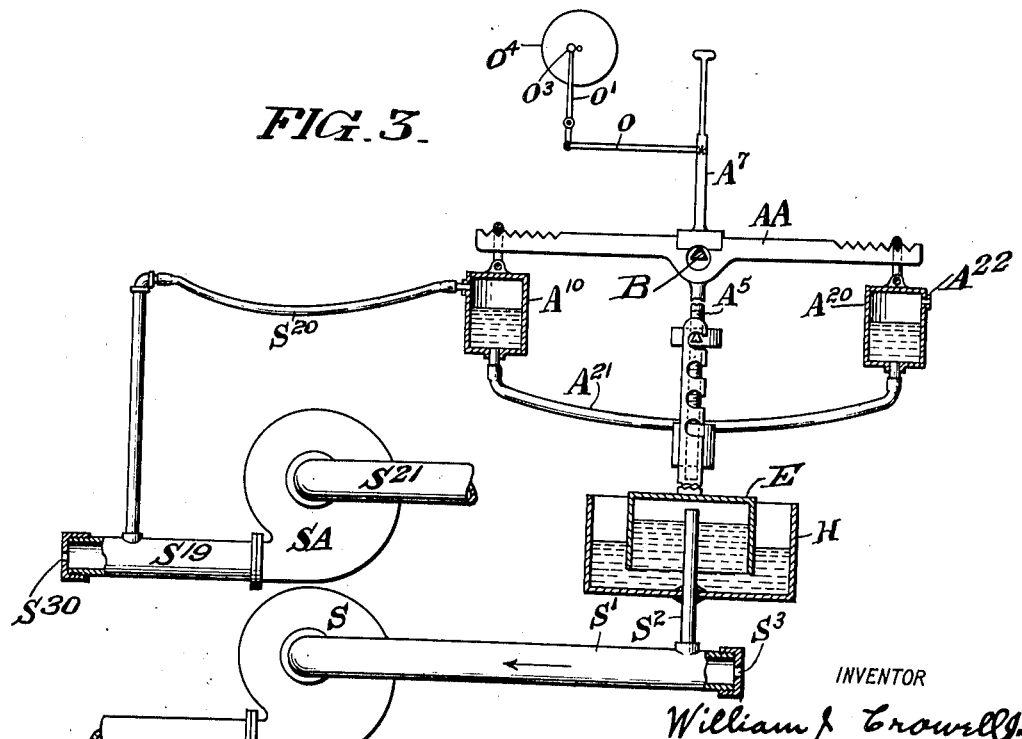
INVENTOR
William J. Crowell Jr.
BY
Chambers + Hubbell
his ATTORNEYs

UNITED STATES PATENT OFFICE.

WILLIAM J. CROWELL, JR., OF WYNCOTE, PENNSYLVANIA.

RATIO INDICATING AND RECORDING METER.

1,308,626.

Specification of Letters Patent.   Patented July 1, 1919.

Application filed August 21, 1918.  Serial No. 250,797.

*To all whom it may concern:*

Be it known that I, WILLIAM J. CROWELL, Jr., a citizen of the United States, and a resident of Wyncote, county of Montgomery, State of Pennsylvania, have invented a certain new and useful Improvement in Ratio Indicating and Recording Meters, of which the following is a true and exact description, reference being had to the accompanying drawings.

My present invention has for its general object to provide a differential pressure apparatus of novel construction and utility which is useful for various purposes. In particular it may be used in the attainment of a specific object of the invention which is to provide novel means for measuring the variable ratio between two variable quantities such as two fluid rates of flow, and for adjusting one quantity so as to maintain a predetermined ratio between that quantity and a second and independently variable quantity.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of my invention.

Of the drawings:

Figure 1 is a somewhat diagrammatic elevation of one form of apparatus employed for maintaining a predetermined ratio between two fluid rates of flow.

Fig. 2 is an elevation with parts broken away and in section of a modified form of a portion of the apparatus shown in Fig. 1, and Fig. 3 is a somewhat diagrammatic elevation of apparatus especially devised for measuring the ratio between the densities of two fluids.

The apparatus shown is adapted for use either in measuring and recording the variable ratio between the fluid rates of flow in a pair of conduits E and I, or for maintaining a predetermined ratio between the rates of flow in said conduits. As shown in Fig. 1, the apparatus comprises a differential pressure gage A of the pivoted U tube type. The gage A consists of a frame pivoted on a knife edge pivot B and supporting the U tube proper. The latter comprises a high pressure cylinder $A'$, a low pressure cylinder $A^2$ and a tube $A^3$ connecting the lower ends of the cylinders. The cylinder $A'$ which is lower than the cylinder $A^2$ when in the zero differential position of the gage is surmounted by a charging connection $A^4$. C represents a flexible pressure transmitting tube connected to the upper end of the cylinder $A'$ through the charging device $A^4$ and $C'$ represents a flexible tube connected to the upper end of the cylinder $A^2$. The lower ends of the tubes C and $C'$ are fixed by being secured to rigid pressure transmitting pipes $D'$ and D, respectively. The tubes C and $C'$ are advantageously formed of small bore metallic piping, and are so disposed that they cross one another at or in close proximity to the pivotal axis of the gage. The frame of the gage comprises an arm $A^5$ extending downwardly below the pivot of the gage, and threaded to adjustably support the balance nut F. The gage frame also comprises an arm $A^7$ connected by the link O to a recording lever $O'$ pivoted at $O^2$. The lever $O'$ carries a marking element $O^3$ which travels over a clock driven record surface $O^4$. In so far as above described, the gage shown is similar to the gage disclosed and claimed in my pending application, Serial No. 149,970, filed February 20, 1917.

While this particular form of gage shown is a desirable one for use in carrying out the present invention, tilting differential gages of other constructions may be used in lieu thereof. To adapt the gage A to the purposes of the present invention as illustrated in Fig. 1, I provide means for subjecting it to a force tending to restore it to its neutral position when displaced therefrom, which force is proportional to the product of the displacement and a differential pressure other than the difference between the pressures in the cylinders $A'$ and $A^2$ which produces the displacement of the gage A. To accomplish this I thread a nut $A^8$ on the arm $A^5$ and provide the nut with trunnions $A^9$ which are adapted to enter one or another of the open sided bearing notches $E^2$ formed in arms $E'$ which are located at opposite sides of arm $A^5$, and are rigidly secured to the top of a bell or inverted cup shaped receptacle E. The bell E dips into a body of sealing liquid G, partially filling a cup shaped receptacle H into which the bell E extends. The tube D' is connected to a Pitot tube located in a conduit E, and the total pressure of the conduit E is therefore transmitted to the upper end of the cylinder A'. Similarly the pipe D and flexible tube C' transmit the static pressure in the conduit E to the upper end of the cylinder A². A pipe I' transmits the static pressure in a conduit I to the interior of the bell E above the sealing liquid partially filling the lower end of the latter. I² represents a restricted inlet orifice opening from the atmosphere into the conduit I. J represents a damper located in the conduit I between the pipe I' and the orifice I² on the one hand and a pump or exhaust (not shown) on the other hand, for creating flow through the conduit I. By adjusting the damper J the conduit may be throttled more or less to correspondingly decrease or increase the flow through the latter. The damper J is adjusted by means of a reversible electric motor K. The latter may be automatically controlled in accordance with the present invention by means of pairs of contacts M and m, suitable circuit connections, 1, 2 and 3 and a source of current L. As shown the two contacts M are mounted on an adjustable support M' located at one side of the enlargement A¹⁰ formed at the upper end of the arm A⁷. Similarly the two contacts m are carried by an adjustable support m' located at the opposite side of the enlargement A¹⁰. With this arrangement a tilting movement of the gage in the clock-wise direction will, through the arm A⁷ and its enlargement A¹⁰ cause the two contacts M to engage and thereby so energize the motor K, that the latter will turn in the direction necessary to adjust the damper J in the closing direction. Conversely when the arm A⁷ turns in the counter clock-wise direction the contacts m engage, and the motor K starts into rotation in the direction to open the damper J.

The apparatus shown in Fig. 1, will when suitably calibrated, maintain a flow through the conduit I in any desired proportion to the flow through the conduit E, and by simply removing the contacts M and m either actually, or functionally by merely spreading the supports M' and m' far enough apart, the apparatus shown will measure and record upon the record surface O⁴ the ratio between the rate of flow in the conduit I and rate of flow in the conduit E regardless of variations in that ratio.

To accomplish this the counterweight F should be adjusted so that the gage A, when it contains the proper amount of sealing liquid, will be in neutral equilibrium, with a zero differential between the pressures in cylinders A' and A² and with the pressure above the sealing liquid in the bell E equal to the pressure of the atmosphere, so that the gage A will then stand in any position within its range of movement into which it may be turned. Thus calibrated, in operation the tilting moment X impressed upon the gage A is that due to the pressure $d$ which is the differential of the pressures in the upper ends of the cylinders A' and A² and the restoring moment Y, is that due to the weight W of the liquid held in the bell E above the level of the liquid in the receptacle H. This weight W is proportional to the pressure $e$ which is the differential between atmospheric pressure and the lower pressure in the conduit I.

In practice the maximum deflection angle R, permitted the tilting gage A is so slight that the variations from unity of the cosine of this angle may be disregarded, and the sine of the angle of deflection may be assumed to vary in direct proportion with the angle. It follows therefore that the tilting moment X may be assumed to vary in direct proportion with the differential pressure $d$, while the restoring moment Y varies directly with the product of the differential pressure $e$ and the angle of deflection R. Hence we have X equal to $Ad$, where A is a constant, the value of which depends upon the location and diameter of the cylinders A' and A², and the density of the sealing liquid. Similarly we have Y equal to $BRe$ where B is a constant the value of which depends upon the diameter of the bell E, the distance between the knife edged pivots A⁹ and B, and the density of the sealing liquid in the bottom of the bell E. When the gage A is in equilibrium, the tilting and restoring moments X and Y, acting on the gage must be equal in magnitude though opposite in direction. Hence we have:

$$Ad = BRe.$$

From this we derive:

$$R = C\frac{d}{e}$$

where C is a constant equal to $\frac{a}{b}$. The angular deflection R of the gage A is thus proportioned to the ratio of the differential pressure $d$ to the differential pressure $e$.

The velocity of flow through the conduit E is approximately proportional to the square root of the pressure differential $d$, and the velocity of flow in the conduit I is approximately proportional to the square root of the pressure differential $e$. It follows therefore that when the contacts M and m are removed or displaced so that the gage A may turn through the necessary range, the marking element O³ will record upon the record disk O⁴, the ratio between the square root of the rate of flow through the conduit E, and the square root of the rate of flow through the conduit I. If the record surface O⁴ is ruled as a square root chart it will thus show directly the ratio between the rates of flow in the conduits E and I. Similarly when the contacts M and m are so disposed that the gage A operates through these contacts and the motor K to maintain a predetermined ratio between the pressures $d$ and $e$, the rates of flow through the conduits E and I are thereby kept in fixed proportion; since if two numbers are kept in a constant ratio, there is also a constant ratio between the square roots of those numbers.

It will be obvious to those skilled in the art that the ratio recorded by the apparatus shown in Fig. 1 when the contacts M and m are dispensed with, or are spread so far apart as to be inoperative, may be varied by raising or lowering the nut $A^8$. When the nut $A^8$ is substantially raised or lowered it is necessary to correspondingly engage the knife edged trunnions $A^9$ in upper or lower notch bearings $E^2$ of the bracket arms $E'$ to preserve a suitable vertical relation between the bell E and receptacle H. When the contacts M and m are in service the ratio between the rates of flow in the conduits E and I thereby maintained may be varied either by raising or lowering the nut $A^8$, or by the simultaneous angular adjustment of the contacts M and m to thereby vary the normal tilt of the gage A.

The apparatus shown in Fig. 1 is suitable for use only where one of the significant low determined pressures to which the apparatus is subjected is the pressure of the atmosphere acting against the exposed upper surface of the sealing liquid in the receptacle H. Where the flow through the conduit to which the differential pressure mechanism connected with the depending arm $A^5$ of the balance is responsive, is a differential of pressures neither of which is the pressure of the atmosphere a different arrangement must be employed. For example such an arrangement may be employed as is shown in Fig. 2. The apparatus shown in Fig. 2 differs from that shown in Fig. 1 only in respect to the differential pressure apparatus secured to the arm $A^5$ of the gage A. In Fig. 2 the bell E is replaced by a closed receptacle R which is connected to the arm $A^5$ as is the bell E in the construction first described. The receptacle R is connected at its lower end by a flexible conduit $P^3$ to the lower end of a stationary receptacle P. The upper end of the latter is connected by the pipe $P'$ to a Pitot tube $P^2$ in the conduit IA. The static pressure in the conduit IA is transmitted to the upper end of the receptacle R by a flexible conduit $P^4$. In practice the flexible connections $P^3$ and $P^4$ should lie in a plane transverse to the plane of the gage A. The conduit $P^3$ and the lower ends of the receptacles P and R are filled with a suitable sealing liquid. With this arrangement the weight of the sealing liquid transferred between the receptacles P and R on a change in the differential between the pressures in the upper ends of the cylinders P and R will be directly proportional to that differential. The apparatus shown in Fig. 2 will operate therefore exactly as does the apparatus shown in Fig. 1.

Instead of using my improved differential apparatus as a means for recording the ratio between two variable rates of flow, or for maintaining a predetermined ratio between the two rates of flow, one of which is an independent variable, I may use the apparatus as a means for determining the relation between the densities of two fluids.

This use of my invention depends upon the principle that with a flowing fluid the velocity head of the fluid stream is directly proportional to the density of the fluid. Thus if two fluids either or both of which may be a liquid or a gas are flowing through separate conduits with the same velocity or with velocities kept in fixed proportion, the relative variation in velocity heads of the two fluid streams (measured in differential pressure) will remain proportional to the relative variation in the densities of the two fluids. In Fig. 3 I have illustrated the use of my differential pressure apparatus in comparing the density of a gas with the density of air by causing equal quantities of air and gas to flow through similar restricted orifices with the pressure at one side of one orifice equal to the pressure at one side of the other orifice. The apparatus shown in Fig. 3 comprises a differential pressure device the gage AA of which might be identical with the gage A of Fig. 1, and, as shown, differs therefrom in that the cylinders $A^{10}$ and $A^{20}$ replacing the cylinders $A'$ and $A^2$ respectively of Fig. 1 are not rigidly secured to the frame of the tilting gage, but are adjustably suspended therefrom. The lower ends of the cylinders $A^{10}$ and $A^{20}$ are connected by a flexible conduit $A^{21}$. With the arrangement shown in Fig. 3 the cylinders $A^{10}$ and $A^{20}$ may each be readily adjusted toward and away from the pivotal axis B, thus increasing the range of adjustability of the apparatus. S and SA are pumps or fans of the same capacity, which may be very small and are driven at the same speed. In practice these pumps are ordinarily tiny fans, identical in construction and have their driving shafts positively connected. As shown the pump S draws air from the atmosphere into its inlet pipe $S'$ through the restricted orifice $S^3$. The pump SA draws gas, the density of which is to be compared with that of air through the gas inlet pipe $S^{21}$, and discharges it through an outlet pipe $S^{10}$ against the pressure of the atmosphere, the discharge being through a restricted orifice $S^{30}$ identical, in its shape and discharge capacity, with the orifice $S^3$. A pipe $S^2$ transmits the pressure in the pipe S' to the upper end of the bell E. The pressure in the pipe $S^{19}$ is transmitted through a conduit including a flexible pipe portion $S^{20}$ to the upper end of the cylinder $A^{10}$. The lower end of the cylinder $A^{10}$ is connected to the lower end of the receptacle $A^{20}$ by the flexible connection $A^{21}$. The receptacle $A^{20}$ is open to the atmosphere at its upper end through a port $A^{22}$. With the apparatus described in Fig. 3, the pressures in the pipes S' and $S^{19}$ will be substantially proportional to the densities of the fluids passing through the pipes provided the volumes of flow through the two pipes are kept in constant ratio.

While in accordance with the provisons of the statutes, I have illustrated and described the best forms of apparatus embodying my invention, and the best modes of using the same now known to me, it will be apparent to those skilled in the art that changes may be made in the form of the apparatus disclosed and the described modes of use of the same without departing from the spirit of my invention as hereinafter claimed, and that the invention is capable of other uses than those specifically mentioned.

Having now described my invention, what I claim as new and desire to secure by Letters Patent, is:

1. Differential pressure apparatus comprising in combination, a tilting element, means for subjecting it to a tilting moment which is substantially proportional to one differential pressure, and means for subjecting it to an opposing tilting moment which is substantially proportional to the product of a second differential pressure and the angular displacement of said element from a neutral position.

2. Differential pressure apparatus comprising a U gage pivoted to turn about a horizontal axis, and having an arm extending downward below said pivotal axis, and differential pressure means for loading said arm with a weight varying in proportion to the differential pressure to which said means are subjected.

3. In combination, a tilting U gage pivoted to turn about a horizontal axis and a receptacle connected to said gage below said axis, a second receptacle, and means for transferring a sealing liquid between said receptacles in proportion to the difference between the pressures in the upper ends of said receptacles.

4. In combination a tilting U gage pivoted to turn about a horizontal axis, a receptacle, means for connecting said receptacle to said U gage at varying distances below said pivotal axis, a second receptacle and a sealing liquid transfer connection between the lower ends of said receptacles, and means for impressing different pressures upon the upper surfaces of the sealing liquid in the two receptacles.

5. In combination, a tilting U gage pivoted to turn about a horizontal axis and provided with a threaded arm extending downward below the pivotal axis, a nut threaded on said arm, a receptacle pivotally suspended from said nut, a second receptacle supported independently to the gage and a sealing liquid transfer connection between the two receptacles, and means for subjecting the upper surface of the sealing liquid in the two receptacles to different pressures.

6. In combination a tilting U gage pivoted to turn about a horizontal axis and having a threaded arm extending downward below said pivotal axis, a nut threaded on said arm and provided with trunnion pivots, a receptacle provided with upwardly extending arms formed with bearings at different elevations adapted to interchangeably receive said trunnion pivots, a second receptacle supported independently of said gage and a sealing liquid transfer connection between said receptacles, and means for subjecting the upper surfaces of the sealing liquid in the receptacles to different pressures.

7. Apparatus for comparing the densities of two fluids, comprising in combination means for setting the fluids in motion and thereby creating pressure differentials proportional to the respective densities of said fluids, and means for measuring the ratio of said differentials.

WILLIAM J. CROWELL, Jr.